(No Model.)

E. G. McCLURE.
MEASURING LINE REEL.

No. 254,881.  Patented Mar. 14, 1882.

Witnesses.
D. L. Lewis
J. H. Hardison

Inventor.
Ernest G. McClure
per Hallock & Hallock
his attys

UNITED STATES PATENT OFFICE.

ERNEST G. McCLURE, OF KENDALL CREEK, PENNSYLVANIA.

MEASURING-LINE REEL.

SPECIFICATION forming part of Letters Patent No. 254,881, dated March 14, 1882.

Application filed January 9, 1882. (No model.)

*To all whom it may concern:*

Be it known that I, ERNEST G. MCCLURE, of Kendall Creek, county of McKean, and State of Pennsylvania, have invented new and useful Improvements in Measuring-Line Reels; and I do hereby declare that the following is a full, clear, and exact description thereof, reference being had to the accompanying drawings and the letters or figures of reference marked thereon.

My invention relates to reels for lowering and raising measuring, torpedo, and sounding lines.

In measuring great depths much time is taken up in paying out and reeling up lines, and in torpedoing wells the explosives are lowered in sections, frequently requiring the line to be lowered and withdrawn from the well several times. With the devices now in use the process is slow. After a well has been torpedoed it is desirable to withdraw the lowering-line very rapidly to prevent its being thrown into bunches by the rising liquid and gas, and to prevent the loss of large portions of the line, for it frequently happens that all the line saved is what has been reeled up while the line and liquid are being thrown to the top of the well. To hasten the work of reeling I provide a secondary shaft having a crank and gearing into the main shaft, so as to turn it with much greater velocity than the crank-shaft.

To enable others skilled in the art to which my invention relates to make and use the same, I will describe its construction and operation, referring to the annexed drawings, in which—

Figure 1:
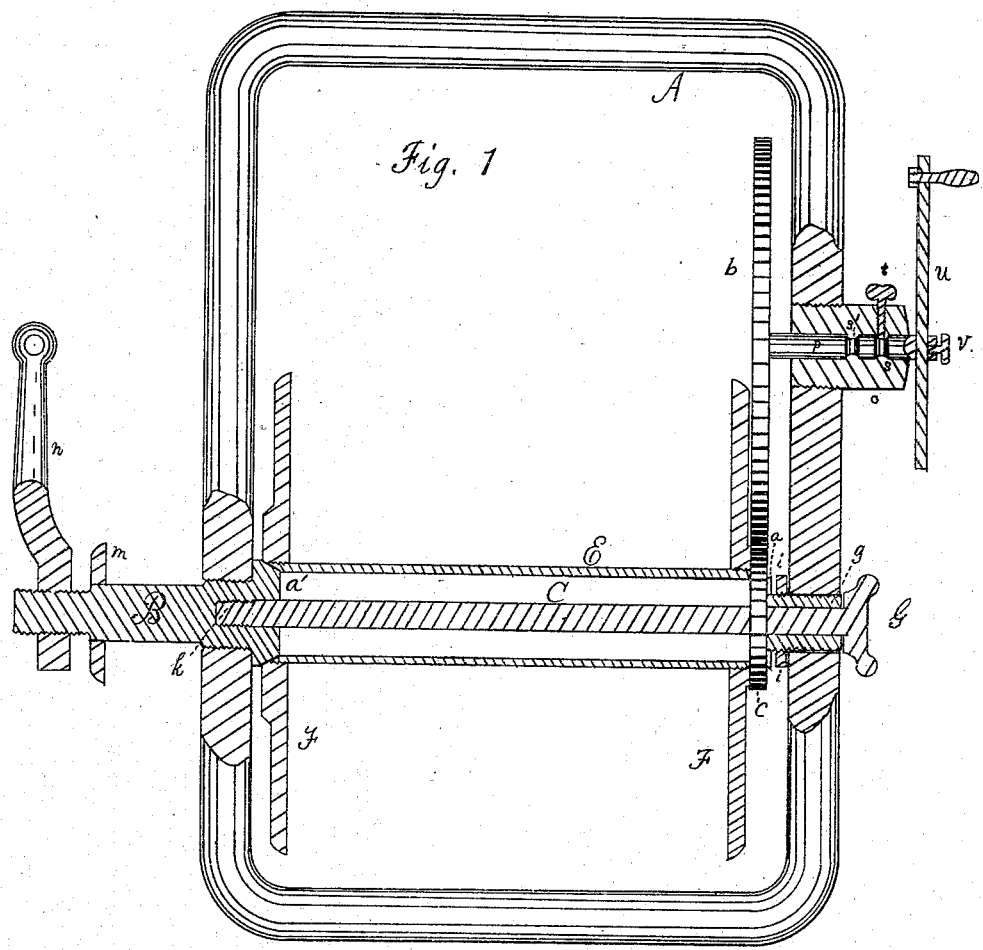
Figure 2:
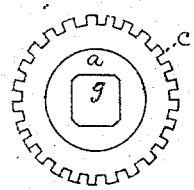

Figure 1 represents a vertical central section of the working parts of my improved reel with the gear-wheels shown in elevation. Fig. 2 shows an end view of the gudgeon $g$, the conical bearing $a$, and the spur-wheel of the main shaft.

In the drawings, A represents the frame of the reel.

B is a bolt or pin, used to secure the reel to some stationary object.

E is the main shaft, to which are firmly attached the arms or disks F F, and revolves upon conical bearings $a\ a'$.

C is a bolt passing through the gudgeon $g$ and centrally through the shaft E, and screwing into the pin B. This gudgeon is inserted in a square hole in the frame of the reel, so as not to turn, but adapted to move endwise in the frame. The gudgeon has screw-threads cut upon its corner, upon which a nut, $i$, is screwed.

G is a thumb-piece or handle, by which the bolt C may be turned.

Upon the main shaft E, and made therewith or firmly attached thereto, is a spur-wheel, $c$, the teeth of which engage with a gear-wheel, $b$, of greater diameter than wheel $c$. The wheel $b$ is attached to the frame by a shaft, P, which is provided with circumferential recesses $s\ s'$ in a plug, $o$, inserted in the frame A. A thumb or set screw is inserted through plug $o$, and is so arranged that its point may enter either of the recesses $s\ s'$ when the gear-wheel is respectively connected or disconnected from spur-wheel $c'$. A handle, $u$, is inserted in the end of shaft $p$, and may be lengthened or shortened by loosening the set-screw $v$ and moving the handle endwise through the slot in shaft P.

The working parts being in the position shown, and the line being coiled upon the shaft E, to use the device the frame is fastened to some stationary object by means of the lever-nut $n$. It will be seen that by turning the bolt C it will be drawn by the screw $k$ into the pin B. The shoulder upon the head G of the bolt will bear upon the end of the gudgeon $g$ and drive it endwise, forcing the shaft over against the conical bearing $a'$ and pressing the bearing $a$ into the end of the shaft, causing so great friction that the reel may be prevented from turning or graduated to operate as a brake, whereby the descent of the line may be regulated to any desired speed.

To insure entire uniformity of speed the hand may be kept upon the crank, and as this shaft turns at a low rate of speed compared to the speed of the main shaft, the operation is much less tiresome than with the old styles of reels.

In lowering a line, when no great care is necessary, the screw $t$ may be loosened and the shaft $p$ drawn endwise, disengaging the two gear-wheels. The recess $s'$ being brought under the screw $t$, the screw may be turned down and the gear-wheel $b$ secured in this disengaged position, and the line lowered and regulated entirely by the bolt C.

A nut, $i$, is placed upon the square gudgeon $g$, and when screwed back against the frame prevents the gudgeon $g$ from working endwise and letting the shaft drop from its bearings; but by running the nut in the opposite direction against the conical bearing $a$ the gudgeon $g$ may be drawn away from its contact with the shaft E and allow the shaft to be removed bodily from the frame.

What I claim as new, and desire to secure by Letters Patent, is—

1. A measuring-reel having its moving parts surrounded and supported by a frame, provided with a device for attaching it to a stationary object, substantially as described.

2. A measuring-reel provided with a secondary shaft having a gear-wheel engaging with a spur-wheel on the main shaft, the whole supported and surrounded by a frame having a device for attaching it to a stationary object, substantially as described, and for the purpose set forth.

3. In a measuring-reel, a frame having a gudgeon provided with a nut anterior to the frame, for the purpose substantially as set forth.

4. In a measuring-reel, a frame having a gudgeon provided with a bearing for a shaft, and a nut anterior to the frame, for the purpose substantially as set forth.

5. In a measuring-reel, a frame having an attaching-pin, provided with a bearing for a shaft, in combination with a gudgeon provided with a bearing for the shaft, and a nut anterior to the frame, for the purpose set forth.

6. In a measuring-reel, a frame having an attaching-pin and a gudgeon arranged upon opposite sides of the frame, a shaft having its bearings upon said pin and gudgeon, and a clamping-bolt for holding the parts in place, all combined and arranged substantially as described, and for the purpose set forth.

7. In a measuring-reel, a frame having bearings arranged upon opposite sides of the frame, a shaft journaled upon said bearings, and provided with a spur-wheel, a bolt for adjusting or clamping the parts, and a driving-wheel meshing in the spur-wheel, all combined and arranged substantially as described.

8. In a measuring-reel, a driving-wheel journaled in a frame and adapted to be moved laterally upon its bearing, and provided with a device, substantially as shown, whereby the shaft, when the wheel has been adjusted, can be fixed, all combined substantially as described, and for the purpose set forth.

9. In a measuring-reel, the combination of a revolving shaft or body having a spur at one end, with a driving-wheel meshing in said gear-wheel, and provided with an adjustable handle, substantially as shown, whereby the speed of the respective parts can be regulated.

In testimony that I claim the foregoing I have hereunto set my hand this 30th day of December, 1881.

ERNEST G. McCLURE.

Witnesses:
J. H. HARDISON,
E. BROOKING.